(12) United States Patent
Heikkila et al.

(10) Patent No.: US 9,068,236 B2
(45) Date of Patent: Jun. 30, 2015

(54) PROCESS OF PRODUCING XYLOSE AND DISSOLVING PULP

(75) Inventors: Heikki Heikkila, Espoo (FI); Jari Lewandowski, Siuntio (FI); Mirja Lindroos, Kirkkonummi (FI); Pia Saari, Espoo (FI)

(73) Assignee: Dupont Nutrition Biosciences APS, Copenhagen (DK)

(*) Notice: Subject to any disclaimer, the term of this patent is extended or adjusted under 35 U.S.C. 154(b) by 188 days.

(21) Appl. No.: 13/125,152

(22) PCT Filed: Oct. 20, 2009

(86) PCT No.: PCT/FI2009/050840
§ 371 (c)(1),
(2), (4) Date: Apr. 20, 2011

(87) PCT Pub. No.: WO2010/046532
PCT Pub. Date: Apr. 29, 2010

(65) Prior Publication Data
US 2011/0192560 A1 Aug. 11, 2011

(30) Foreign Application Priority Data
Oct. 21, 2008 (FI) .................................... 20085997

(51) Int. Cl.
| | |
|---|---|
| D21C 1/04 | (2006.01) |
| C13K 13/00 | (2006.01) |
| C13B 20/14 | (2011.01) |
| C13B 20/16 | (2011.01) |
| C13B 30/02 | (2011.01) |
| C13K 1/04 | (2006.01) |
| D21C 11/00 | (2006.01) |
| D21C 3/02 | (2006.01) |

(52) U.S. Cl.
CPC ............. *C13K 13/002* (2013.01); *C13B 20/148* (2013.01); *C13B 20/165* (2013.01); *C13B 30/02* (2013.01); *C13K 1/04* (2013.01); *D21C 1/04* (2013.01); *D21C 3/02* (2013.01); *D21C 11/0007* (2013.01)

(58) Field of Classification Search
USPC .......................................................... 162/29
See application file for complete search history.

(56) References Cited

U.S. PATENT DOCUMENTS

| | | | | |
|---|---|---|---|---|
| 3,132,051 | A | * | 5/1964 | Nobile et al. ................... 127/36 |
| 5,084,104 | A | | 1/1992 | Heikkila et al. |
| 5,139,617 | A | | 8/1992 | Tikka et al. |
| 5,589,033 | A | * | 12/1996 | Tikka et al. ..................... 162/84 |
| 6,086,681 | A | * | 7/2000 | Lindroos et al. ................ 127/37 |
| 2002/0153317 | A1 | | 10/2002 | Heikkila et al. |
| 2003/0222021 | A1 | | 12/2003 | Ennelin et al. |
| 2005/0220951 | A1 | * | 10/2005 | Abbas et al. ................... 426/482 |
| 2007/0051481 | A1 | | 3/2007 | Tan et al. |
| 2007/0254348 | A1 | | 11/2007 | Retsina et al. |

FOREIGN PATENT DOCUMENTS

| | | |
|---|---|---|
| DE | 23 28 450 A1 | 1/1975 |
| FI | 63267 B | 6/1982 |
| FI | 97625 B | 10/1996 |
| WO | WO96/27028 A1 | 9/1996 |
| WO | 98/16682 A3 | 4/1998 |
| WO | 99/34021 A1 | 7/1999 |
| WO | WO02/053781 A1 | 7/2002 |
| WO | WO02/053783 A1 | 7/2002 |
| WO | 2005/001145 A1 | 1/2005 |
| WO | WO2006/115310 A1 | 11/2006 |
| WO | WO2007/048879 A1 | 5/2007 |
| WO | 2007/111605 A1 | 10/2007 |
| WO | 2007/138167 A1 | 12/2007 |

OTHER PUBLICATIONS

Springer, Edward L. et al., "Prehydrolysis of birch wood with sulfur dioxide," Tappi (1980), vol. 63, No. 7, pp. 119-120.
Kosaya, G.S. et al., "New Method of Prehydrolysis," Bumazh. Prom. No. 9, 12-13 (Sep. 1982) Journal Article.
Finnish Search Report dated Jun. 12, 2009 issued in FI20085997.
International Search Report dated Feb. 2, 2010 issued in PCT/FI2009/050840.
Cultor Technology, Compositions of SO2 prehydrolysate samples and Acacia wood chips, (1998).
Radiotis, T., et al., "Optimizing production of xylose and xylooligomers from wood chips", NWBC, 92-99 (2011).
Extended Supplementary European Search Report dated Apr. 8, 2015 from related European Application No. 09 821 646.8.

* cited by examiner

*Primary Examiner* — Jacob Thomas Minskey
(74) *Attorney, Agent, or Firm* — Scully, Scott, Murphy & Presser, P.C.

(57) ABSTRACT

The present invention relates to a process for the production of xylose and dissolving pulp from xylan-containing biomass, such as hardwood. The invention is based on prehydrolysis of the xylan-containing biomass with $SO_2$ in specified conditions, followed by chromatographic fractionation, nanofiltration or precipitation crystallization of the xylose-containing prehydrolyzate to obtain a xylose product having a xylose content of at least 55% on DS. The dissolving pulp obtained from the process can be used for example for the production of viscose.

31 Claims, No Drawings

PROCESS OF PRODUCING XYLOSE AND DISSOLVING PULP

FIELD OF THE INVENTION

The present invention relates to a process for the production of xyllose and dissolving pulp from xylan-containing biomass, such as hardwood.

BACKGROUND OF THE INVENTION

U.S. Pat. No. 3,132,051, Ledoga S. p. A (publ. 5 May 1964) discloses a process for the preparation of concentrated solutions of xylose by treating vegetable substance containing hemicelluloses with a solution of sulphur dioxide. The process is carried out in a closed vessel at a temperature of 60 to 130° C. for from 1 to 6 hours in the substantial absence of a liquid phase, i.e. with a low water/wood ratio. It is recited in the reference that the amount of sulphur dioxide is in the range of 1 to 10% of anhydrous vegetable substance. It is also recited in the reference that the residual cellolignin material can be used for dextrose saccharification or cellulose manufacture or as a fuel or for the production of rayon.

DE OS 23 28 450, Lignin-Chemie Waldhof GmbH (publ. 2 Jan. 1975) discloses a process for the production of crystalline xylose from wood by hydrolysis with an excess of $SO_2$ under pressure, followed by neutralization with ammonia and crystallization. According to the example, the hydrolysis is carried out with an aqueous solution containing about 30 g/l $SO_2$. The hydrolysis temperature is 130° C. and the hydrolysis time is 2 hours. It is recited in the reference that the wood residue from the hydrolysis can be used in alkaline cellulose processes for the production of cellulose.

U.S. Pat. No. 4,075,406, Suomen Sokeri Osakeyhtiö, Melaja A. J. et al. (publ. 21 Feb. 1978) relates to a method for the production of xylose from a pentose-rich solution obtained by acid hydrolysis of a pentosan-containing raw material, especially xylan-containing raw material. The method comprises fractionation with ion exchange chromatographic techniques. The fractionation may be carried out with a polystyrene sulfonate cation exchange resin, which may be in an alkaline earth metal salt form. In Example I, the fractionation is carried out with a strongly acid cation exchange resin in strontium form. According to Example II, the acid hydrolysis for obtaining the starting material for the fractionation is carried out with sulphuric acid.

E. L. Springer and K. A. Libkie describe prehydrolysis of birch wood with sulfur dioxide in Tappi, vol. 63, No. 7 (July 1980), pp. 119-120. According to the experimental part of the reference, the prehydrolysis was carried out in vapor phase in the following conditions: a temperature of 100 and 120° C., a reaction time of 120 min, a water/wood ratio of 0.57:1 and the amount of $SO_2$ of 14% and 13% in liquid. It is presented in the reference that xylose solutions with concentrations above 10% were obtained. It is also presented that the suitability of the prehydrolyzed residues for further processing to pulp, glucose or other products needs to be carefully studied.

Finnish Patent 63267 (corresponding to CA Patent 1 173 602), A. Ahlström Osakeyhtiö (publ. 9 Jun. 1982) discloses a process for producing high alpha-cellulose special pulps by means of a multistep cook, which comprises prehydrolysis with a mineral acid and cooking with sulphate method. The prehydrolysis is carried out in the presence of 1 to 2% of sulphuric acid or 0.3 to 1.0% sulphur dioxide based on the dry weight of the wood, at a liquid to wood ratio of 1:2.5 to 1:3.5 and at a temperature from 140 to 150° C. for 30 to 60 minutes, whereby 20 to 30% of the dry matter of the wood is dissolved. It is recited that the hydrolyzate separated from the chips contains the dissolved hemicellulose, most of which has been decomposed to monosaccharides.

G. S. Kosaya, V. D. Kosheleva & M. A. Prokop'eva describe a new method of prehydrolysis in the manufacture of kraft dissolving pulp in Bumazh. Prom. No. 9: 12-13 (September 1982). It is recited that the new prehydrolysis method, which hydrolyzes carbohydrates and sulfonates lignin, involves the use of an aqueous sulfur dioxide solution (e.g. the effluent from the acidification of bleached pulp). It is also recited that the new method permits a reduction in the prehydrolysis time and temperature and an increase in pulp yield (by 1.0-1.5%) while maintaining the required pulp quality. The optimum sulfur dioxide dosage is recited to be 0.05-0.10% by weight of oven-dry wood. The prehydrolysis was carried out at 165-170° C. for 45 minutes. The raw materials for the dissolving pulp were pinewood and larchwood. Xylose is not recovered and consequently no xylose yields are mentioned.

U.S. Pat. No. 4,436,586, Kamyr Inc. (publ. 13 Mar. 1984) discloses a method of producing carbohydrate material and kraft pulp from cellulosic fiber material by mild acid prehydrolysis (0.2-0.5% $H_2SO_4$ and a temperature of about 120° C. or less), followed by mild caustic pre-extraction (0.5-4.0% NaOH and a temperature of about 60-90° C.), removing the carbohydrate-containing hydrolyzate from the cellulosic material and effecting kraft cooking of the prehydrolyzed and pre-extracted cellulosic material to produce kraft pulp. It is recited that the hydrolyzate contains hexose and pentose sugars, which can be fermented to produce ethanol and butanol, for example.

U.S. Pat. No. 5,139,617, Suomen Sokeri Oy, Tikka P. O. et al. (publ. 18 Aug. 1992) relates to a process for the production of a hemicellulose hydrolyzate and a special pulp, such as dissolving pulp, from lignocellulose-containing material. The process comprises prehydrolysis and sodium sulphite cook using antraquinone as a cooking aid. The prehydrolysis may be carried out e.g. with water, a mineral acid, such as sulphuric acid, sulphur dioxide, sulphite cooking acid or sulphite waste liquor at a temperature of 100 to 180° C., preferably 155 to 170° C. for a period of 10 to 200 minutes, preferably 90 to 170 minutes. The amount of sulphur dioxide in the prehydrolysis in Examples 1 and 2 is recited to be 0.25% on dry wood. It appears from the reference that the hemicellulose hydrolyzate recovered from the prehydrolysis may be useful for the production of sugars. However, there is no experimental data of the recovery of sugars.

U.S. Pat. No. 5,589,033, Sunds Defibrator Pori Oy (publ. 31 Dec. 1996) relates to a pulp production process comprising prehydrolysis to produce prehydrolyzed cellulosic material and a prehydrolyzate, neutralization of the prehydrolyzed cellulosic material and prehydrolyzate, removing the neutralized hydrolyzate and subjecting the cellulosic material to alkaline cooking with sodium sulfide and sodium hydroxide. It is recited in the reference that part of the hydrolyzate may be recovered before the neutralization step, and can used, for example for the production of ethanol. Recovery of xylose is not mentioned.

U.S. Pat. No. 5,676,795, Voest-Alpine Industrieanlagenbau GmbH (publ. 14 Oct. 1997) discloses a process for producing viscose pulp from lignocellulosic material by a steam prehydrolysis sulfate (Kraft) displacement digestion process. However, the prehydrolyzate is not recovered in this process.

WO 02/053781 A1 (publ. 11 Jul. 2002, Danisco Sweeteners Oy) discloses a nanofiltration process for separating compounds, such as sugars (including xylose) from various starting materials, for example from biomass hydrolyzates. It is recited that the biomass hydrolysate may be obtained from cellulosic material for example by treatment with sulphur dioxide. No further data on the sulphur dioxide treatment is presented.

In the production of dissolving pulp for viscose production, hemicelluloses and especially xylan must be removed, because they disturb the viscose production process by causing higher consumption of process chemicals. The production of high quality dissolving pulp by kraft process conventionally involves prehydrolysis with steam with or without acid to dissolve hemicelluloses (U.S. Pat. No. 5,676,795 cited above). In general, the prehydrolysis product is neutralized in the digester without the removal of the prehydrolyzate, which includes dissolved hemicelluloses. The delignification is carried out by kraft cooking with alkaline cooking chemicals to produce dissolving pulp having the desired kappa and viscosity (such as a kappa of less than 14 and a viscosity of more than 600 ml/g). After cooking, the spent liquor is separated from pulp. Spent liquor contains degradation products of carbohydrates from the hemicellulose hydrolyzate as well as lignin but not recoverable amounts of sugars.

BRIEF DESCRIPTION OF THE INVENTION

It is thus an object of the present invention to provide an improved process for the production of xylose and dissolving pulp from xylan-containing biomass. The objects of the invention are achieved by a process which is characterized by what is stated in the independent claim. The preferred embodiments of the invention are disclosed in the dependent claims.

The invention is based on the use of sulphur dioxide in the prehydrolysis of the xylan-containing biomass and adjusting the prehydrolysis conditions so as to obtain a prehydrolyzate rich in xylose, while maintaining the prehydrolyzed biomass suitable for the production of dissolving pulp. Sulphur dioxide in the prehydrolysis is able to sulphonate lignin partly and makes dissolved components more hydrophilic and thus preventing back-precipitation on the pulp.

It is an advantage of the present invention that both xylose and dissolving pulp with good yields can be obtained from the same process. Further advantages of the process relate to reduced amounts of oligomers, including xylo-oligomers, furfural and problematical deposits and precipitations in the prehydrolyzate and in the subsequent treatment thereof, compared to known prehydrolysis methods with other acids and/or steam. Furthermore, the prehydrolyzate contains only relatively small amounts of lignin component e.g. in comparison to sulphite spent liquor. The dissolved components of the prehydrolyzate are more hydrophilic than for example after hydrolysis with sulphuric acid. Thus xylose can be separated from the prehydrolyzate for example by chromatographic techniques without any significant precipitation problems on the separation resin.

In the present invention, the acidic xylose-containing prehydrolyzate is separated from the prehydrolyzed biomass (raw material for dissolving pulp) before the kraft cooking step. This provides a further advantage that the kraft cook consumes a lower amount of effective alkali (e.g. $Na_2O$) than those kraft cooking processes where the separation is not effected, i.e. where the hydrolysis acid as well as xylose and other sugars from the wood material are still present in the cooking step and are exposed to degradation and neutralization reactions. Recovery of the cooking chemicals is easier, too.

DETAILED DESCRIPTION OF THE INVENTION

The invention relates to a process for the production of xylose and dissolving pulp from xylan-containing biomass, which has a xylan content of 10 to 35%, calculated on the dry substance of the biomass. The process of the invention comprises, as characteristic elements, the following steps:

(a) prehydrolyzing the xylan-containing biomass in a digester with a solution containing sulphur dioxide in a concentration of 0.1 to 2.5% based on the total liquid weight of the prehydrolysis liquid, at a temperature of 100 to 180° C. and with a reaction time of 0.1 to 2 h, to provide (1) a dissolved hemicellulose hydrolyzate, wherein the xylose content is 25 to 55% on DS, the ratio of xylose to xylo-oligomers is more than 2 and the xylose yield is 30 to 80% on xylan in the biomass, and (2) a non-dissolved prehydrolyzed biomass, (b) separating the dissolved hemicellulose hydrolyzate from the non-dissolved prehydrolyzed biomass, (c) subjecting the dissolved hemicellulose hydrolyzate having a xylose content of 25 to 55% to chromatographic fractionation, nanofiltration or precipitation crystallization to obtain a xylose product having a xylose content of at least 55% on DS, (d) subjecting the non-dissolved prehydrolyzed biomass to cooking with sulphate method in the digester to obtain dissolving pulp with a kappa of less than 14 and a viscosity of more than 600 ml/g, and (e) recovering the xylose product having a xylose content of at least 55% on DS and the dissolving pulp.

The xylan-containing biomass used as starting material in the present invention has a xylan content of 10 to 35%, calculated as total xylan in biomass (determined as xylose after analytical hydrolysis without any conversion factor). The xylan-containing biomass is typically lignocellulosic material. The xylan-containing biomass is preferably selected from hardwood, straw and bagasse. The hardwood may be selected for example from birch, maple, beech, aspen, oak, poplar, gum tree, acacia tree and eucalyptus and mixtures thereof. Even herbaceous plants, such as reed, reed canary grass, bagasse, bamboo and straw, such as corn straw are useful sources for xylan-containing biomass.

The xylan-containing biomass is as a rule added to the prehydrolysis reactor in a comminuted form, such as in the form of chips or sawdust.

In one embodiment of the invention, the reaction time in the prehydrolysis temperature is 0.3 to 1 h.

In a further embodiment of the invention, the concentration of sulphur dioxide in the prehydrolysis is 0.1 to 2.0%, preferably 0.3 to 1.5%, based on total liquid weight of the prehydrolysis liquid.

The sulphur dioxide used as the prehydrolysis agent is added to the xylan-containing biomass in an amount of 0.1 to 2.5% based on the total liquid weight of the prehydrolysis liquid. "The total liquid weight" in connection with the present invention refers to the total amount of the liquid (from the prehydrolysis reagent and the biomass) present in the prehydrolysis.

The sulphur dioxide may be added as a water solution or in a liquid or gas form. In a typical embodiment of the invention, the sulphur dioxide is impregnated into the xylan-containing biomass.

The liquid/biomass ratio in the prehydrolysis is typically less than 6, preferably less than 4, more preferably less than 3 and most preferably less than 2. The liquid/biomass ratio may be in the range of 1 to 6, preferably 1 to 4, for example.

The spent sulphur dioxide is recovered and at least partly returned back to the prehydrolysis. In one embodiment of the invention, the spent sulphur dioxide is recovered by dissolving into water, after it has been liberated from the digester. In another embodiment of the invention, the spent sulphur dioxide is recovered by compressing.

The prehydrolysis temperature is in the range of 100 to 180° C., preferably 120 to 150° C. and most preferably 135 to 145° C. The prehydrolysis time may be from 5 min to 4 h, typically 0.1 to 2 h, preferably from 0.3 h to 1.0 h. In one embodiment of the invention, the appropriate prehydrolysis temperature may be achieved and maintained by heating with direct steam.

The prehydrolysis typically dissolves 15 to 40%, preferably 20 to 35% of the dry substance of the xylan-containing biomass.

The prehydrolysis produces a dissolved hemicellulose hydrolyzate, wherein the xylose content is 25 to 55%, preferably 35 to 55% on DS. Furthermore, the prehydrolysis produces a non-dissolved prehydrolyzed biomass for the manufacture of dissolving pulp by kraft cook (sulphate cook).

In a preferred embodiment of the invention, the ratio of xylose to xylo-oligomers in the dissolved hemicellulose hydrolyzate is more than 5, preferably more than 10, more preferably more than 20, most preferably more than 40 and especially more than 100.

The concentration of oligosaccharides in the dissolved hemicellulose hydrolyzate is typically less than 10%, preferably less than 8%, more preferably less than 4%, most preferably less than 2%, and especially less than 1%, based on DS (dissolved solids).

The content of monosaccharides in the dissolved hemicellulose hydrolyzate is typically more than 35%, preferably more than 45%, based on DS. The content of xylose in the dissolved hemicellulose hydrolyzate is typically more than 65%, preferably more than 75%, based on total monosaccharides.

The lignin content in the dissolved hemicellulose hydrolyzate is preferably less than 30% and more preferably less than 20% and most preferably less than 15% based on RDS.

The xylose-containing hemicellulose hydrolyzate has a typical dry substance content of more than 7% by weight, preferably more than 10% by weight, more preferably more than 14% by weight. The dry substance content may be in the range of 5 to 15% by weight, preferably 10 to 15% by weight (determined after the washing stage).

The yield of xylose, including xylo-oligomers, in the hemicellulose hydrolyzate is preferably in the range of 30 to 80%, preferably 50 to 70% on xylan in the biomass.

Step (b) of the process of the invention comprises separation of the dissolved hemicellulose hydrolyzate from the non-dissolved prehydrolyzed biomass.

The separation of step (b) may be carried out by washing, for example with displacement wash. The displacement wash may be carried out in the digester with a liquid selected from a condensate, white liquor, separation residue fraction and a nanofiltration retentate. The displacement wash typically provides a yield of 50 to 95% of monomeric xylose dissolved from the biomass. The washing stage may also be carried out outside the digester by conventional means, such as press filters or band filters. Washing may also be carried out with a neutralizing liquid (in the digester or outside the digester), whereby the out coming liquid has advantageously a pH of less than 7, less than 6 or less than 5, for example.

In one embodiment of the invention, the process also comprises evaporation of the prehydrolyzate after steps (a) and (b). In the evaporation, acetic acid is partially removed from the prehydrolyzate by evaporation and recovered into the evaporation condensate, especially at a pH of less than 4.

In another embodiment of the invention, the process of the invention also comprises pH adjustment (neutralization) of the separated prehydrolyzate. The neutralization may be carried out before the evaporation or before the fractionation step (c). The neutralization may be carried out with bases, such as monovalent bases (e.g. NaOH) or multivalent bases (such as $Ca(OH)_2$ or $Mg(OH)_2$). The pH adjustment is typically carried out to a pH of 2.5 to 7, preferably 4 to 6.5 and most preferably 5.5 to 6.0. In one embodiment of the invention, the pH adjustment is carried out with $Ca(OH)_2$ to a pH of 2 to 3.

The process of the invention may also comprise post-hydrolysis after the prehydrolysis step (a) to provide a post-hydrolysis product, where the ratio of xylose to xylo-oligomers is more than 10. The post-hydrolysis may be an enzymatic post-hydrolysis or post-hydrolysis with a mineral acid such as sulphuric acid or sulphur dioxide, for example. The enzymatic post-hydrolysis may be carried out for example with xylanolytic enzymes, such as endoxylanase enzymes, such as xylanases and β-xylosidase.

The process of the invention may also comprise prefiltration after the neutralization and evaporation, to remove suspended solids. Filter aids may be used in the prefiltration, if desired.

Step (c) of the process of the invention comprises subjecting the dissolved hemicellulose hydrolyzate having a xylose content of 25 to 50% on dissolved solids to chromatographic fractionation, nanofiltration or precipitation crystallization to obtain a xylose product having a xylose content of at least 55% on DS. In one embodiment of the invention, the xylose product/xylose solution having a xylose content of 55 to 95%, preferably 65 to 85% on DS is obtained. The xylose product may be a xylose fraction (a solution enriched in xylose) obtained from the chromatographic fractionation or nanofiltration. The xylose product may also be a crystalline xylose product obtained from the precipitation crystallization.

The chromatographic fractionation is carried out with ion exchange resins as the column filling material. The ion exchange resins may be selected from cation exchange resins and anion exchange resins.

The cation exchange resins may be selected from strongly acid cation exchange resins and weakly acid cation exchange resins. In a preferred embodiment of the invention, the cation exchange resins are strongly acid cation exchange resins.

The strongly acid cation exchange resins may be in a monovalent or multivalent metal cation form. In a preferred embodiment of the invention, the resins are in $Na^+$ form. The resin may also be in H+, $Mg^{2+}$, $Ca^{2+}$ or $Zn^{2+}$ form, for example.

In an especially preferred embodiment of the invention, the chromatographic fractionation is carried out with a strongly acid cation exchange resin in $Na^+$ form.

The strongly acid cation exchange resins typically have a styrene skeleton, which is preferably cross-linked with 3 to 8%, preferably 5 to 6.5% of divinylbenzene.

The weakly acid cation exchange resins may be in a monovalent or multivalent metal cation form, preferably in $Na^+$ form. The resin may also be in free acid form, $H^+$, $Mg^{2+}$ or $Ca^{2+}$ form, for example.

The weakly acid cation exchange resins have a styrene or acrylic skeleton. The resin is preferably cross-linked with 3 to 8%, preferably 5 to 6.5% divinylbenzene.

In another embodiment of the invention, the chromatographic fractionation may carried out with anion exchange resins. The anion exchange resins may be strongly basic anion exchange resins or weakly basic anion exchange resins. The anion exchange resins may have an acrylic or styrene skeleton, which may be crosslinked with divinylbenzene in the same way as above.

The average particle size of the separation resins is normally 10 to 2000 μm, preferably 100 to 400 μm. The resins are preferably in a gel form.

Manufacturers of the separation resins are for example Finex Oy, Dow Chemicals Ltd., Lanxess AG, Purolite Ltd. and Rohm & Haas.

The chromatographic fractionation may be carried out as a batch process or simulated moving bed process (SMB process). The SMB process may be carried out as a sequential or continuous process.

The temperature of the chromatographic fractionation is typically in the range of 20 to 90° C., preferably 40 to 65° C. The pH of the solution to be fractionated may be the acidic hydrolyzate as such or adjusted to the pH range of 2.5 to 7, preferably 3.5 to 6.5 and most preferably 4 to 5.5. The fractionation is typically carried out with a linear flow rate of about 1 m/h-10 m/h in the separation column.

The chromatographic fractionation may also comprise recovering further fractions containing xylose, which are returned to the chromatographic fractionation.

Alternatively, step (c) of the process of the invention comprises nanofiltration to obtain a xylose fraction having a xylose content of at least 55% on DS. The desired xylose fraction having a xylose content of at least 55% on DS, preferably at least 70% on DS is recovered as the nanofiltration permeate.

In the nanofiltration, the dissolved hemicellulase hydrolyzate is used as a feed without pH adjustment or preferably neutralized to a pH in the range of 2.5 to 7, preferably 5 to 6.5, especially 5.5 to 6.0. The neutralization is preferably carried out with divalent agents, such as $Ca(OH)_2$.

The nanofiltration is typically carried out at a pressure of 10 to 50 bar, preferably 15 to 40 bar. A typical nanofiltration temperature is 5 to 95° C., preferably 30 to 70° C. The nanofiltration is typically carried out with a flux of 1 to 100 $l/m^2h$, preferably 3 to 20 $l/m^2h$.

The nanofiltration membrane can be selected from polymeric and inorganic membranes having a cut-off size of 100-2500 g/mol, preferably 150 to 1000 g/mol, most preferably 150 to 500 g/mol. The nanofiltration membranes have typically a divalent ion retention of more than 95%.

Typical polymeric nanofiltration membranes useful in the present invention include, for example, polyether sulfone membranes, sulfonated polyether sulfone membranes, polyester membranes, polysulfone membranes, aromatic polyamide membranes, polyvinyl alcohol membranes and polypiperazine membranes and combinations thereof. Cellulose acetate membranes are also useful as nanofiltration membranes in the present invention.

Typical inorganic membranes include $ZrO_2$-, $TiO_2$- and $Al_2O_3$-membranes, for example.

Preferred nanofiltration membranes are selected from sulfonated polysulfone membranes and polypiperazine membranes. For example, specific useful membranes are: Desal-5 DL nanofiltration membrane (manufacturer Osmonics), NF-200 and NF 270 nanofiltration membrane (manufacturer Dow Deutschland), for example.

The nanofiltration membranes are as a rule provided in a flat sheet form. The membrane configuration in the nanofiltration is typically selected from spiral membranes, but may also be selected e.g. from tubes and hollow fibers. "High shear" membranes, such as vibrating membranes and rotating membranes can also be used.

Before the nanofiltration procedure, the nanofiltration membranes may be pretreated with alkaline detergents or ethanol, for example.

In a typical nanofiltration operation, the liquor to be treated is fed through the nanofiltration membrane using the temperature and pressure conditions described above. The liquor is thus fractionated into a low molar mass fraction including xylose (permeate) and a high molar mass fraction including the non-desired components of the prehydrolyzate (retentate).

The nanofiltration can be carried out batchwise or continuously. The nanofiltration procedure can be repeated once or several times. Recycling of the permeate or the retentate back to the feed vessel can also be used.

In a further embodiment of the invention, the dissolved hemicellulose hydrolyzate obtained from the prehydrolysis is subjected to precipitation crystallization.

In the precipitation crystallization, the crystallization is essentially carried out by means of nucleation. The precipitation crystallization is preferably carried out at high viscosity and at high supersaturation and it may include boiling or cooling stages, or both.

The precipitation crystallization may be carried out as described in U.S. Pat. No. 5,980,640. In one embodiment of the invention, the precipitation crystallization can be carried out starting from a purity of more than 35%. The solution is evaporated to a concentration higher than 75% to bring the solution to sufficient supersaturation to effect nucleation at a temperature of 60 to 70° C. The crystallization mass is then cooled under agitation until the viscosity of the crystallization mass is high, typically over 50 Pas. The agitation is continued at a temperature of 20 to 40° C. until the crystallization has proceeded sufficiently. Thereafter, the viscosity of the crystallization mass is adjusted to an adequate value (10 to 70 Pas) for the separation of the crystals by adding water or optionally an organic solvent such as ethanol or methanol. The crystals are then separated by centrifugation or filtration, for example using a pressure filter. The content of the desired compound in the crystals thus obtained is typically more than 60%, preferably more than 70%. Washing the crystals will produce crystals, which have an increased purity (higher than 75%).

The xylose product having a xylose content of at least 55% on DS, obtained from the dissolved hemicellulose hydrolyzate by the chromatographic fractionation, nanofiltration or precipitation crystallization, is recovered.

The product thus obtained (such as a xylose fraction obtained from the chromatographic fractionation or nanofiltration) may be concentrated for example by evaporation. The products thus obtained may be subjected to crystallization.

Chromatographic fractionation typically provides a xylose fraction (product), which has a xylose content of more than 70% on DS and a xylose yield of more than 95% based on the xylose in the feed to fractionation. The precipitation crystallization provides a typical precipitate having xylose content of more than 70% on DS and a xylose yield of more than 70%. Nanofiltration provides a typical permeate having a xylose content of more than 75% on DS and a xylose yield of more than 90%.

In one embodiment of the invention, when feeding a dissolved hemicellulose hydrolyzate having a xylose content of about 40% on DS, to the chromatographic fractionation with a strongly acid cation exchange resin in $Na^+$ form, a maximum xylose content of about 65 to 75% on DS is obtained. For comparison purposes, chromatographic fractionation with a strongly acid cation exchange resin in $Ca^{2+}$ form in same conditions provides a xylose content of about 55 to 65% on DS.

In step (d) of the process of the invention, the non-dissolved prehydrolyzed biomass is subjected to kraft cook to obtain dissolving pulp with a kappa of less than 14, preferably less than 12, and a viscosity of more than 600 ml/g. In a preferred embodiment of the invention, the kraft cook provides dissolving pulp with a viscosity of more than 700 ml/g.

In the kraft cooking, the prehydrolyzed biomass is cooked to dissolving pulp having the desired kappa of less than 14 and a viscosity of more than 600 ml/g. The kraft cook is carried out by conventional methods applied to prehydrolysis-sulphate processes known for the manufacture of dissolving pulp. The cooking conditions may be for example as follows: effective alkali ($Na_2O$) charge in the range of 15 to 25% on pulp DS, sulphidity in the range of 20 to 40%, cooking temperature in the range of 160 to 170° C. and cooking time in the range of 0.75 h to 3 h.

The dissolving pulp obtained from the kraft cook is recovered. The dissolving pulp can be used for the production of viscose and rayon, for example.

The xylose product recovered from the chromatographic fractionation, nanofiltration or precipitation crystallization is further subjected to crystallization to obtain crystalline xylose. The crystallization may be carried out by any conventional crystallization methods, such as boiling crystallization, cooling crystallization and precipitation crystallization, or a combination thereof. Seeding may be used, if desired. The crystallization is preferably carried out in water, but an alcohol, such as ethanol, or a mixture of water and alcohol can be used. The crystals are recovered for instance by centrifugation or filtering. The recovered crystals have a xylose content higher than 95% on DS, preferably higher than 98% on DS.

The crystallization run-off obtained from the crystallization may be subjected to a further chromatographic fractionation or nanofiltration to obtain a further solution enriched in xylose, which is returned to the crystallization.

The following examples are illustrative embodiments of the invention without limiting the scope of the claims in any way.

In the following examples and throughout the specification, DS, RDS, kappa, viscosity, xylan/xylose content of wood, pulp yield, xylose yield, monosaccharides, oligosaccharides, xylobiose and lignin were determined by the following methods:

DS refers to the measurement of the dry substance content by Karl Fischer method.

RDS refers to the refractometric measurement of the dry substance content.

Kappa (kappa number/lignin content) was measured by SCAN-C 1:77.

Pulp viscosity was measured by SCAN-CM 15:88.

Xylan/xylose content of wood chips was determined by TAPPI T 249 cm-85 method without any conversion factor.

Pulp yields (on pulp DS) were measured by SCAN-C 3:78.

Xylose yields per wood DS were calculated from the percentage of dissolved solids (which was obtained from pulp yield).

The total amount of oligosaccharides (oligomers) and monosaccharides was determined by HPLC with $Na^+$ form ion exchange column and RI detection.

Individual monosaccharides were determined by HPLC with $Pb^{2+}$ form ion exchange columns and RI detection.

Xylobiose was determined by Dionex, PED.

Lignin in the examples and throughout the specification refers to lignin, which is partially sulphonated but less derivatized than lignosulphonates in sulphite cooking. Lignin was determined by gel permeation chromatography with diode array detection (UV 230 nm) or from UV absorbance at 280 nm, using absorptivity of 17 l/g/cm, including all substances with absorptivity at 230 nm.

EXAMPLE 1

Prehydrolysis (1) of Hardwood by $SO_2$ Followed by Kraft Cook

The prehydrolysis was carried out in a 10-liter rotating autoclave. 3.46 kg of birch chips were charged into the autoclave, corresponding to 1.90 kg dry substance (DS). The chips and the autoclave were first heated by steaming for 15 min. Then 3.20 kg of 0.58% $SO_2$-water was added (liquid to wood ratio 2.5). The autoclave was closed, and heating to 145° C. was started. The heating time was 30 min, and the temperature was held at 145° C. for 60 min. In the end the autoclave was cooled, opened, and the liquid phase (prehydrolyzate) was recovered into another vessel. A sample of the prehydrolyzate was analyzed.

The prehydrolyzed chips were washed with deionized water, and the washing waters were combined with the prehydrolyzate. The yield was determined from the weight and DS of the chips. The yield was 76.9% on DS of the original chips, and thus 23.1% of wood DS dissolved in the hydrolysis. Xylose yield into the prehydrolyzate was 9.6% on wood DS, corresponding to 44% of xylose contained in the original wood chips.

The table below gives the compositions of the prehydrolyzate and the evaporated prehydrolyzate after filtration.

|  | Hydrolyzate | Evaporated and filtrated |
|---|---|---|
| DS, w-% | 8.8 | 37.1 |
| Composition, % on RDS |  |  |
| Oligosaccharides | 6.1 | 7.4 |
| Monosaccharides | 53.6 | 62.8 |
| Glucose | 2.3 | 2.8 |
| Xylose | 43.5 | 50.5 |
| Galactose & Rhamnose | 3.4 | 4.1 |
| Arabinose | 1.6 | 1.9 |
| Mannose | 2.8 | 3.4 |
| Acetic acid | 13.6 | 0.6 |

The prehydrolyzed chips were recharged into the autoclave for kraft cooking. The cooking conditions were as follows: alkali charge 18% of $Na_2O$, the temperature rise to cooking temperature 170° C. was 60 min, and cooking time at 170° C. was 75 min. After cooling, the pulp was washed with deionized water and further centrifuged and homogenized.

Total pulp yield was 35.7% on original wood chips. The pulp viscosity was 720 $dm^3/kg$, and the Kappa number was 12.1.

EXAMPLE 2

Prehydrolysis (2) of Hardwood by $SO_2$, Followed by Post-hydrolysis with $SO_2$ and Kraft Cook The prehydrolysis was carried out in a 10-liter rotating autoclave. 2.75 kg of Acacia wood chips were charged into the autoclave, corresponding to 1.80 kg dry substance (DS). The chips and the autoclave were first heated by steaming for 15 min. Then 6.25 kg of 0.29% $SO_2$-water was added (liquid to wood ratio 4:1). The autoclave was closed, and heating to 140° C. was started. The heating time was 30 min, and the temperature was held at 140° C. for 60 min. In the end the autoclave was cooled, opened, and the liquid phase (prehydrolyzate) was recovered into another vessel. The prehydrolyzed chips were washed properly with deionized water, and the washing waters were combined with the prehydrolyzate. Composition of the prehydrolyzate with the washing waters is given in the table below.

The yield in the prehydrolysis was determined from the weight and DS of the chips. The yield was 78.9% on DS of the original chips, and thus 21.1% of the wood DS dissolved in the hydrolysis.

Xylose yield (as monomers) into the hydrolyzate was 6.8% on original wood DS, corresponding to 67% of xylose contained in the original wood chips.

Part of the prehydrolyzate was post-hydrolysed to degrade oligosaccharides to monomer sugars at pH 0.8 (adjusted with 1% $SO_2$-water) by heating at 140° C. for 30 min. The post-hydrolyzed prehydrolyzate was evaporated by rotavapor to the concentration about 40% (Büchi Rotavapor R-153). Composition of the pre-hydrolyzate and the composition after the posthydrolysis and after the posthydrolysis and evaporation is given in the table below.

|  | Hydrolyzate | After post hydrolysis | After evaporation |
|---|---|---|---|
| DS, w-% | 4.6 | 4.3 | 39.2 |
| Composition, % on RDS | | | |
| Oligosaccharides | 6.4 | 1.6 | 1.6 |
| Monosaccharides | 39.1 | 47.5 | 50.4 |
| Acetic acid | 9.2 | 9.5 | 4.6 |
| Furfural | 0.6 | 0.6 | 0.2 |
| Lignin | 24.8 | | |
| Monosaccharide composition, % on RDS | | | |
| Glucose | 1.4 | 1.5 | 1.6 |
| Xylose | 31.2 | 36.8 | 40.4 |
| Galactose & Rhamnose | 4.1 | 4.5 | 5.0 |
| Arabinose | 1.7 | 1.8 | 2.0 |
| Mannose | 0.7 | 1.2 | 1.3 |

Total xylose yield into the prehydrolyzate (after the post-hydrolysis) was 8.0% on wood DS, corresponding to 78.8% of xylose contained in the original acacia wood chips.

The prehydrolyzed chips were recharged into the autoclave for kraft cooking. The cooking conditions were as follows: alkali charge 22% of $Na_2O$, sulphidity 35%, the temperature rise to cooking temperature 170° C. was 60 min and cooking time at 170° C. was 75 min. After cooling the pulp was washed with deionized water and further centrifuged and homogenized.

Total pulp yield was 36.1% on original wood chips, and the yield after screening was 35.4%. The pulp viscosity was 640 dm$^3$/kg, and the Kappa number 11.6.

EXAMPLE 3

Prehydrolysis (3) of Bagasse by $SO_2$

Sugar cane bagasse was processed in a continuous, plant scale hydrolysis process (Rosenlew reactor). Bagasse was fed with gate feeder at the top of the tower reactor by an average rate of 4.7 m$^3$/h, which is 2300 kg bagasse/h corresponding to the dry weight of bagasse 650 kg/h. Steam and gaseous $SO_2$ were fed to the bottom of the reactor by average rates, respectively, 0.4 t/h and 46 kg/h. $SO_2$ concentration of the liquid phase surrounding bagasse fibers was 2%, and liquid:bagasse ratio (on DS) was 3.2.

The reactor temperature was set to 145° C. The delay time of bagasse in the reactor, from gate feeder to the blow valve, was determined to be about 105 min.

After 2.5 h processing the reactor was full. Collecting of pulp samples (pre-hydrolyzed bagasse) from blow tank was started 1 hour later. The sample collection continued for 6 hours at about 30 min intervals. During that time the reactor temperature was 147±1° C.

Pulp yield of each sample was determined by washing the sample properly with deionized water; the yield was obtained from the weights and the dry substance contents before and after the washing.

Pulp yield was in the average 76% on DS of the bagasse, and thus about 24% of the bagasse DS dissolved in the hydrolysis.

Prehydrolyzates were obtained by pressing the liquid out of the pulp samples (the part of sample that had not been washed for pulp yield). Xylose content and the amount of dissolved solids of the prehydrolyzate samples were in the average 42.5% on RDS and 8.5%, respectively.

Xylose monomers yield into the prehydrolyzates was, in the average, 12.6% on DS of bagasse, corresponding to 52% of xylose contained in the original bagasse.

(B) Post-hydrolysis (1) of the Prehydrolyzate by Enzymes

The prehydrolyzate obtained according to a similar procedure as in Example 3 (A) is post-hydrolyzed enzymatically as follows:

Xylo-oligomers in the prehydrolyzate were hydrolyzed enzymatically to xylose with an enzyme mixture where the main enzyme activities were endoxylanase and beta-xylosidase. Before the enzyme addition, the pre-hydrolysate (200 ml), was diluted to a 5% DS solution and pH was adjusted to pH 4.5 with NaOH. The temperature of the feed liquid was controlled to be 40° C. and 0.3 ml Multifect GC-140 (Genencor Inc.) enzyme mixture was added. The endoxylanase activity of Multifect GC-140 was analyzed to be 273 000 nkat/ml and the beta-xylosidase activity was respectively 210 nkat/ml. The enzyme reaction was continued for 48 hours in a mixed reaction vessel. After the reaction, the enzymes were inactivated by heating the mixture to 70° C. for 30 minutes.

|  | DS, % | Xylose, % on DS | Oligomers, % on DS | Glucose, % on DS | Arabinose, % on DS | Others, % on DS |
|---|---|---|---|---|---|---|
| Feed solution | 5 | 38.7 | 12.1 | 2.9 | 1.8 | 31.8 |
| After enzyme hydrolysis | 5 | 49.0 | 1.0 | 2.8 | 1.8 | 32.7 |

(C) Post-hydrolysis (2) of the Prehydrolyzate by Enzymes

Xylo-oligomers in the prehydrolyzate were hydrolyzed enzymatically to xylose with an enzyme mixture where the main enzyme activities are endoxylanase and beta-xylosidase. Before enzyme addition the prehydrolyzate (200 ml) was diluted to 5% DS solution and pH was adjusted with NaOH to pH 4.5. The temperature of the feed liquid was controlled to be 40° C. and 0.3 ml Multifect GC-140 (Genencor inc.) enzyme mixture was added. The endoxylanase activity of Multifect GC-140 was analyzed to be 273 000 nkat/ml and the beta-xylosidase activity was respectively 210 nkat/ml. The enzyme reaction was continued for 48 hours in a mixed reaction vessel. After the reaction, the enzymes were inactivated by heating the mixture to 70° C. for 30 minutes.

|  | DS, % | Xylose, % on DS | Oligomers, % on DS | Glucose, % on DS | Arabinose, % on DS | Others, % on DS |
|---|---|---|---|---|---|---|
| Feed solution | 5 | 33.7 | 11.8 | 2.4 | 2.6 | 49.5 |
| After enzyme hydrolysis | 5 | 44.6 | 0.8 | 2.5 | 2.4 | 49.7 |

EXAMPLE 4

Prehydrolysis (4) of Birch Wood by $SO_2$

The prehydrolysis is carried out in a 10-liter rotating autoclave. 2.61 kg of birch chips are charged into the autoclave, corresponding to 1.50 kg dry substance (DS). The chips and the autoclave are first heated by steaming for 15 min. Then 1.50 kg of 2.0% $SO_2$-water is added (liquid to wood ratio 1.7). The autoclave is closed, and heating to 140° C. started. The heating time is 30 min, and the temperature is held at 140° C. for 20 min. In the end the autoclave is cooled, opened, and the liquid phase (prehydrolyzate) is recovered into another vessel. The prehydrolyzed chips (pulp) are washed with deionized water, and the washing waters are combined with the prehydrolyzate.

The pulp yield is determined from the weight and from the DS of the pulp. The yield is 76.9% on DS of the original chips, and thus 23.1% of wood DS dissolved in the hydrolysis. Xylose yield is 9.5% on wood DS, corresponding to 43.6% of xylose contained in the original wood chips.

The prehydrolyzate is evaporated by rotavapor (Büchi Rotavapor R-151) to RDS of 41.1%. Part of the sulphite and sulphate in the liquid is precipitated by adding in small portions 20% lime milk $(Ca(OH)_2)$ to a pH of about 2.7. The calcium sulphate precipitate is then filtered off. The liquid is mixed over night at room temperature, and finally the precipitate is filtrated off (through filter paper in Bühner funnel).

The following table gives the compositions of the prehydrolyzate with washing waters, evaporated prehydrolyzate and the prehydrolyzate after lime milk addition and filtration.

|  | Hydrolyzate | After evaporation | After lime milk and filtration |
|---|---|---|---|
| RDS, w-% | 6.3 | 41.2 | 31.0 |
| Composition, % on RDS | | | |
| Oligosaccharides | 5.2 | 5.7 | 6.2 |
| Monosaccharides | 50.5 | 55.2 | 60.0 |
| Acetic acid | 10.6 | 2.3 | 2.5 |
| Monosaccharide composition, % on RDS | | | |
| Glucose | 4.6 | 5.0 | 5.5 |
| Xylose | 41.0 | 44.8 | 48.7 |
| Galactose & Rhamnose | 2.0 | 2.2 | 2.4 |
| Arabinose | 1.3 | 1.4 | 1.5 |
| Mannose | 1.7 | 1.9 | 2.0 |

EXAMPLE 5

Chromatographic Separation of Hardwood $SO_2$-prehydrolyzate at pH 4.0

The process equipment included a separation column, feed pump, eluent water pump, heat exchangers, flow control means for the out-coming liquid as well as inlet and product valves for the various process streams. The separation column (having a diameter of 4.4 cm) was packed with a strong acid gel type cation exchange resin (manufactured by Finex) in $Na^+$-form so that the height of the resin bed was 0.80 m. The divinylbenzene content of the resin was 5.5% and the mean bead size of the resin was 0.28 mm.

A hardwood $SO_2$ prehydrolyzate obtained in accordance with example 2 was used as the feed and the aim was to separate xylose contained therein. The feed prehydrolyzate was pretreated by evaporation, filtering, pH adjustment with NaOH and finally pre-coat filtering.

The concentration of the feed hydrolyzate was 31.0 g/100 ml and the pH was 4.0. The hydrolyzate was composed as set forth below, whereby the percentages are given on a dry substance weight basis (measured by refractive index).

TABLE 5.1

| Composition of the feed | % on RDS |
|---|---|
| Oligomers | 0.7 |
| Glucose | 2.5 |
| Xylose | 37.2 |
| Arabinose | 1.6 |
| Lignin | 10.5 |
| Others | 47.5 |

The separation took place at a temperature of 65° C. and water was used as the eluent. The feed volume was 137 ml and the flow rate for the feed and elution was 0.24 l/h. Feed interval was 147 min.

Following fractions were collected from the separation column product valves: residual fraction, two recycle fractions (both sides of the xylose peak) and xylose product fraction. The result including HPLC analyses for the residual fraction, combined recycle fractions and the xylose fraction are set forth in the table below.

TABLE 5.2

|  | Residual | Recycle | Xylose |
|---|---|---|---|
| Volume, l | 0.28 | 0.12 | 0.18 |
| Dissolved solids, g/100 ml | 6.2 | 7.8 | 9.5 |
| Composition, % on RDS | | | |
| Oligomers | 0.7 | 2.0 | 1.0 |
| Glucose | 0.6 | 3.5 | 3.8 |
| Xylose | 3.8 | 41.3 | 70.2 |
| Arabinose | 0.5 | 1.8 | 2.7 |
| Lignin | 12.9 | 9.9 | 4.3 |
| Others | 81.5 | 41.5 | 18.0 |

The overall xylose yield calculated from the residual fraction and xylose fraction is 95.0%. The recycle fraction was used in the next feeds.

EXAMPLE 6

Chromatographic Separation of Hardwood $SO_2$ Prehydrolyzate at pH 5.5

The process equipment included a separation column, feed pump, eluent water pump, heat exchangers, flow control means for the out-coming liquid as well as inlet and product valves for the various process streams. The separation column (having a diameter of 4.4 cm) was packed with a strong acid gel type cation exchange resin (manufactured by Finex) in $Na^+$-form so that the height of the resin bed was 0.80 m. The divinylbenzene content of the resin was 5.5% and the mean bead size of the resin was 0.28 mm.

A hardwood $SO_2$ prehydrolyzate obtained in accordance with Example 2 used as the feed and the aim was to separate xylose contained therein. The feed prehydrolyzate was pretreated by evaporation, filtering, pH adjustment and finally pre-coat filtering.

The concentration of the feed hydrolyzate was 31.1 g/100 ml and the pH was 5.5. The hydrolyzate was composed as set forth below, whereby the percentages are given on a dry substance weight basis.

TABLE 6.1

| Composition of the feed | % on RDS |
|---|---|
| Oligomers | 0.5 |
| Glucose | 2.2 |
| Xylose | 35.5 |
| Arabinose | 1.5 |
| Lignin | 10.4 |
| Others | 49.9 |

The separation took place at a temperature of 65° C. and water was used as the eluent. The feed volume was 137 ml and the flow rate for the feed and elution was 0.24 l/h. Feed interval was 139 min.

Following fractions were collected from the separation column product valves: residual fraction, two recycle fractions (both sides of the xylose peak) and xylose product fraction. The results including HPLC analyses and lignin analysis by gel permeation chromatography for the residual fraction, combined recycle fractions and the xylose fraction are set forth in the table below.

TABLE 6.2

|  | Residual | Recycle | Xylose |
|---|---|---|---|
| Volume, l | 0.26 | 0.12 | 0.18 |
| Dissolved solids, g/100 ml | 5.7 | 8.4 | 10.2 |
| Composition, % on RDS |  |  |  |
| Oligomers | 0.7 | 2.3 | 0.6 |
| Glucose | 0.4 | 2.8 | 3.9 |
| Xylose | 4.3 | 30.0 | 70.3 |
| Arabinose | 0.8 | 1.4 | 2.6 |
| Lignin | 14.0 | 11.8 | 5.1 |
| Others | 79.9 | 51.7 | 17.5 |

The overall xylose yield calculated from the residual fraction and xylose fraction is 95.3%. The recycle fraction was used in the next feeds.

EXAMPLE 7

(A) Chromatographic Separation of Birch $SO_2$-prehydrolyzate with a Strong Acid Cation Exchange Resin in $Na^+$ Form The process equipment included a separation column, feed pump, eluent water pump, heat exchangers, flow control means for the out-coming liquid as well as inlet and product valves for the various process streams. The separation column (having a diameter of 0.225 m) was packed with a strong acid gel type cation exchange resin in $Na^+$-form so that the height of the resin bed was 4.5 m. The divinylbenzene content of the resin was 5.5% and the mean bead size of the resin was 0.45 mm.

A birch $SO_2$ prehydrolyzate prepared in accordance with Example 1 was used as the feed and the aim was to separate xylose contained therein. The prehydrolyzate was pretreated by evaporation, filtering, pH adjustment to 6.1 with NaOH and finally pre-coat-filtering.

The concentration of the feed hydrolyzate was 29.9 g/100 ml and the pH was 6.1. The hydrolyzate was composed as set forth below, whereby the percentages are given on a dry substance weight basis.

TABLE 7.1

| Composition of the feed, % on RDS | |
|---|---|
| Oligomers | 6.3 |
| Glucose | 6.0 |
| Xylose + Gal + Man + Rha | 54.3 |
| Arabinose | 1.5 |
| Others | 31.9 |

The feed and the eluent were used at a temperature of 65° C. and water was used as the eluent. The feed volume was 18.3 l and the flow rate for the feed and elution was 50 l/h. Feed interval was 95 min.

After equilibration of the system with several feeds, the following fractions were drawn from the separation column product valves: residual fraction, two recycle fractions (both sides of the xylose peak) and xylose product fraction. The result including HPLC analyses using $Na^+$ form ion exchange resin for the residual fraction, combined recycle fractions and the xylose fraction are set forth in the table below. Due to the used HPLC-method, indicated xylose content (% on RDS) includes xylose, galactose (Gal), mannose (Man) and rhamnose (Rha). Xylose represents 75-80% of the monosaccharides.

TABLE 7.2

|  | Residual | Recycle | Xylose |
|---|---|---|---|
| Volume, l | 45.8 | 8.3 | 25.0 |
| Dissolved solids, g/100 ml | 4.3 | 4.9 | 11.1 |
| Composition, % on RDS |  |  |  |
| Oligomers | 9.0 | 14.2 | 3.3 |
| Glucose | 3.3 | 11.0 | 7.2 |
| Xylose + Gal + Man + Rha | 6.5 | 70.0 | 86.2 |
| Arabinose | 0.0 | 1.6 | 2.4 |
| Others | 81.2 | 3.2 | 0.9 |
| pH | 5.8 | 6.0 | 6.1 |

The overall xylose yield calculated from the residual fraction and xylose fraction is 94.9%. The recycle fraction was used in the next feeds.

(B) Chromatographic Separation of Birch $H_2SO_4$-prehydrolyzate with a Strong Acid Cation Exchange Resin in $Ca^{2+}$ Form (Comparison Example)

The process equipment included a separation column, feed pump, eluent water pump, heat exchangers, flow control means for the out-coming liquid as well as inlet and product valves for the various process streams. The column (having a diameter of 0.225 m) was packed with a strong acid gel type cation exchange resin (manufactured by Zerolit) in $Ca^{2+}$-form so that the height of the resin bed was 4.3 m. The divinylbenzene content of the resin was 3.5 to 4.0% and the mean bead size of the resin was 0.39 mm.

A prehydrolyzate obtained from birch $H_2SO_4$ hydrolysis was used as the feed and the aim was to separate xylose contained therein. The feed solution was pH adjusted with Ca(OH)$_2$ and finally pre-coat filtered.

The concentration of the feed hydrolyzate was 25.6 g/100 ml and the pH was 6. The hydrolyzate was composed as set forth below, whereby the percentages are given on a dry substance weight basis.

TABLE 7.3

| Composition of the feed, % on RDS | |
|---|---|
| Acetate | 21.8 |
| Disaccharides | 2.3 |
| Monosaccharides | 58.6 |
| Others | 17.3 |

The eluent was used at a temperature of 59° C. and water was used as the eluent. The feed volume was 14.9 l and the flow rate for the feed and elution was 40 l/h. Feed interval was 135 min.

After equilibration of the system with several feeds, the following fractions were drawn from the separation column product valves: residual fraction, recycle fraction and monosaccharide product fraction. The result including HPLC analyses for the residual fraction, recycle fraction and the monosaccharide fraction are set forth in the table below.

TABLE 7.4

|  | Residual | Recycle | Xylose |
|---|---|---|---|
| Volume, l | 65.0 | 10.0 | 15.0 |
| Dissolved solids, g/100 ml | 1.1 | 4.2 | 11.6 |
| Composition, % on RDS | | | |
| Acetate | 21.1 | 27.6 | 20.3 |
| Disaccharides | 9.3 | 1.0 | 0.0 |
| Monosaccharides | 19.6 | 59.4 | 74.1 |
| Others | 50.0 | 12.0 | 5.6 |

The overall xylose yield calculated from the residual fraction and the product fraction is 90.2%. Approximately 75% of the monosaccharides consists of xylose. The recycle fraction was used in the next feeds.

EXAMPLE 8

Chromatographic Separation of Birch SO$_2$-prehydrolyzate

The process equipment included a separation column, feed pump, eluent water pump, heat exchangers, flow control means for the out-coming liquid as well as inlet and product valves for the various process streams. The column (having a diameter of 2.76 m) was packed with a strong acid gel type cation exchange resin (manufactured by Finex) in Na$^+$-form so that the height of the resin bed was 4.5 m. The divinylbenzene content of the resin was 5.5% and the mean bead size of the resin was 0.45 mm.

A birch SO$_2$ prehydrolyzate prepared in accordance with Example 1 was used as the feed and the aim was to separate xylose contained therein. The prehydrolyzate was pretreated by evaporation, filtering, pH adjustment to 4.6 with NaOH and finally pre-coat filtering.

The concentration of the feed was 43.3 g/100 ml and the pH was 4.6. The hydrolyzate was composed as set forth below, whereby the percentages are given on a dry substance weight basis.

TABLE 8.1

| Composition of the feed, % on RDS | |
|---|---|
| Trimers | 3.6 |
| Dimers | 8.5 |
| Glucose | 2.9 |
| Xylose | 51.4 |
| Arabinose | 1.8 |
| Others | 31.8 |

The feed and the eluent were used at a temperature of 65° C. and water was used as the eluent. The feed volume was 2.0 m$^3$ and the flow rate for the feed and elution was 6.0 m$^3$/h. Feed interval was 16.5 m$^3$.

After equilibration of the system with several feeds, the following fractions were drawn from the separation column product valves: residual fraction, two recycle fractions (both sides of the xylose peak) and xylose product fraction. The result including HPLC analyses with Na$^+$ form ion exchange resin for the residual fraction, combined recycle fractions and the xylose fraction are set forth in the table below.

TABLE 8.2

|  | Residual | Recycle | Xylose |
|---|---|---|---|
| Volume, m$^3$ | 12.1 | 1.9 | 2.5 |
| Dissolved solids, g/100 ml | 2.4 | 6.3 | 16.5 |
| Composition, % on RDS | | | |
| Trimers | 9.5 | 1.6 | 0.2 |
| Dimers | 10.4 | 17.7 | 4.6 |
| Glucose | 3.0 | 5.8 | 2.0 |
| Xylose | 6.5 | 55.7 | 81.3 |
| Arabinose | 0.0 | 3.7 | 2.4 |
| Others | 70.6 | 15.5 | 9.5 |
| pH | 5.1 | 4.7 | 4.6 |

The overall xylose yield calculated from residual fraction and xylose fraction is 94.7%. The recycle fraction was used in the next feeds.

EXAMPLE 9

Chromatographic SMB Separation of Hardwood SO$_2$ Prehydrolyzate

The process equipment includes three columns connected in series, feed pump, recycling pumps, eluent water pump, heat exchangers, flow control means for the out-coming liquids as well as inlet and product valves for the various process streams. The columns (having a diameter of 0.2 m) are packed with a strong acid gel type cation exchange resin (manufactured by Finex) in Na$^+$-ion form so that the height of resin bed in each column is 3.4 m. The divinylbenzene content of the resin is 5.5% and the mean bead size of the resin is 0.35 mm.

As a feed; evaporated, pH adjusted and pre-coat filtered hardwood SO$_2$ pre-hydrolysate is used and the aim is to separate xylose contained therein.

The DS of the feed hydrolyzate is 58.0 g/100 ml and the pH 4.5. The hydrolyzate is composed as set forth below, whereby the percentages are given on a dry substance weight basis.

TABLE 9.1

| Composition of the feed, % on RDS | |
|---|---|
| Oligomers | 0.7 |
| Glucose | 2.5 |
| Xylose | 42.5 |

TABLE 9.1-continued

| Composition of the feed, % on RDS | |
|---|---|
| Other monosaccharides | 8.9 |
| Others | 45.4 |

The fractionation is performed according to a 14-step SMB sequence as set forth below in equilibrium state. The feed and the eluent are used at a temperature of 65° C. and water is used as an eluent.

Step 1: 5 l of feed solution is pumped into the first column at a flow rate of 100 l/h and a recycle fraction is collected from the last column.

Step 2: 21 l of feed solution is pumped into the first column at a flow rate of 100 l/h and a residual fraction is collected from the same column. Simultaneously 38 l of water is pumped into the second column at a flow rate of 185 l/h and first 14 l of recycle fraction and then 24 l of xylose fraction is collected from the last column.

Step 3: 32 l of feed solution is pumped into the first column at a flow rate of 120 l/h and a xylose fraction is collected from the last column.

Step 4: 3 l is circulated in the column set loop, formed with all columns, at a flow rate of 120 l/h.

Step 5: 23 l of water is pumped into the last column at a flow rate of 120 l/h and a residual fraction is collected from the second column.

Step 6: 35 l is circulated in the column set loop, formed with all columns, at a flow rate of 140 l/h.

Step 7: 23 l of water is pumped into the first column at a flow rate of 140 l/h and a residual fraction is collected from the last column.

Step 8: 35 l is circulated in the column set loop, formed with all columns, at a flow rate of 140 l/h.

Step 9: 22 l of water is pumped into the second column at a flow rate of 140 l/h and a residual fraction is collected from the first column.

Step 10: 35 l is circulated in the column set loop, formed with all columns, at a flow rate of 150 l/h.

Step 11: 22 l of water is pumped into the last column at a flow rate of 150 l/h and a residual fraction is collected from the second column.

Step 12: 35 l is circulated in the column set loop, formed with all columns, at a flow rate of 150 l/h.

Step 13: 21 l of water is pumped into the first column at a flow rate of 160 l/h and a residual fraction is collected from the last column.

Step 14: 30 l is circulated in the column set loop, formed with all columns, at a flow rate of 160 l/h.

After equilibration of the system, the following fractions are drawn from the system: Two residual fractions from each column, xylose-containing fractions from the last column and recycle fractions from the last column. The result including HPLC analyses for the combined fractions are set forth in the table below.

TABLE 9.2

| | Residual | Recycle | Xylose |
|---|---|---|---|
| Volume, l | 129 | 19 | 56 |
| Dissolved solids, g/100 ml | 9.3 | 25.2 | 29.1 |
| Composition, % on RDS | | | |
| Oligomers | 1.2 | 0.9 | 0.3 |
| Glucose | 1.4 | 4.4 | 2.7 |
| Xylose | 5.0 | 41.5 | 70.2 |

TABLE 9.2-continued

| | Residual | Recycle | Xylose |
|---|---|---|---|
| Other monosaccharides | 1.9 | 8.5 | 14.1 |
| Others | 90.5 | 44.7 | 12.7 |

The overall xylose yield calculated from the residual fraction and xylose fraction is 95.0%. The recycle fraction is used in the next feeds.

EXAMPLE 10

Nanofiltration of Hardwood $SO_2$ Prehydrolyzate at pH 5.5

Nanofiltration of hardwood prehydrolyzate from Example 5 was carried out on 1000 kg batch of xylose-containing wood hydrolyzate which had a dry substance content of 29% and a pH adjusted to 5.5 with NaOH. The nanofiltration equipment used for the nanofiltration was a pilot-size membrane test unit equipped with two Osmonics Desal 5 DL spiral membranes, each spiral membrane having an area of 6.1 $m^2$, thus the total area of the spiral wound membrane was 12.2 $m^2$. The nanofiltration was carried out at a constant pressure of 29 bar (inlet pressure) and at a temperature of 68° C. During 24 hours' nanofiltration run, the flux decrease caused by the rise of density in the retentate was prevented by adding ion free water to the circulation tank with an automated system, which kept the density of the concentrate at a constant level. The amount of the produced xylose-rich permeate was 1600 kg. The final amount of retentate was 345 kg having a dry substance content of 36.0%. The average liquid flux through the nanofiltration membrane during the batch run was 5 kg/m2/h.

Table 10 shows the dry substance content (%) and the xylose content (% on DS) of the feed, concentrate and permeate of the nanofiltration. The xylose yield in the permeate was 97%.

TABLE 10

Dry substance content and xylose content of the nanofiltration fractions

| | Batch size, kg | RDS, % | Xylose, % on RDS |
|---|---|---|---|
| Feed solution | 1000 | 29 | 37 |
| Concentrate out | 345 | 36 | 4 |
| Permeate | 1600 | 9.5 | 68 |

EXAMPLE 11

Precipitation Crystallization of Xylose from Hardwood $SO_2$-prehydrolyzate

The evaporated prehydrolyzate obtained in accordance with Example 2 (RDS 31%) was used for xylose crystallization test. pH of the solution was adjusted with NaOH solution to 3.5. 25 kg of the pH adjusted solution was evaporated to RDS of 88% by using a vacuum evaporator (Büchi Rotavapor R-151). The bath temperature during the evaporation was about 75° C. 8.05 kg of the evaporated mass was charged into a 6-liter cooling crystallizer having a jacket temperature of 65° C. 1.0 g of xylose seed crystals were mixed into the mass. (The seed crystals were prepared by milling pure xylose crystals in a mortar). Then a linear cooling program was started from 65° C. to 35° C. in 30 h. The crystallization mass was mixed during cooling. The mass was diluted to adjust the viscosity.

In the end temperature (35° C.), xylose crystals were separated from the crystallization mass by centrifugation. Centrifuge Hettich Roto Silenta II was used with a basket diameter of 23 cm. Centrifugation tests with and without a filter cloth in the basket was done. 1.0 to 1.3 kg of crystallization mass was centrifuged at 3500 rpm for 5 min. In the centrifugation without the filter cloth in the basket the crystals were washed (sprayed) with 80 ml of water while increasing the rotation speed to 3500 rpm. After the centrifugations, the obtained crystal cakes were weighed.

The following table 11 presents the centrifugation results.

TABLE 11

Centifugation results

| | Centrifugation 1 with filter cloth | Centrifugation 2 no filter cloth |
|---|---|---|
| Mass into centrifuge, g | 1040 | 1311 |
| Mass RDS, % | 85.4 | 85.4 |
| Mass, xylose, % on DS | 44.3 | 44.3 |
| Crystals washing (ml) | — | 80 |
| Crystal cake weight, g | 307 | 318 |
| Crystal cake DS content, % | 93.4 | 95.2 |
| Crystal cake xylose, % on DS | 78.1 | 83.8 |
| Run-off, xylose, % on DS | 28.2 | 29.7 |
| Xylose yield/on xylose % | 57 | 51 |

EXAMPLE 12

Crystallization of Xylose from the Xylose Fraction Obtained from Chromatographic Separation of an SO$_2$-prehydrolyzate Xylose fractions obtained from the chromatographic separations of the prehydrolyzate according to Examples 5 and 6 were combined and concentrated to RDS of 56% by a pilot falling-film evaporator. With this solution two xylose crystallization tests were done, in which cooling rates were different; otherwise the crystallization procedure was the same in both crystallizations.

12 kg of the evaporated solution was further evaporated to RDS of 85% by using a vacuum evaporator (Büchi Rotavapor R-153). The bath temperature during the evaporation was about 75° C. 8.1 to 8.4 kg of the evaporated mass was charged into a 6-liter cooling crystallizer having a jacket temperature of 68° C. 1.0 g of xylose seed crystals were mixed into the mass. (The seed crystals were prepared by milling pure xylose crystals in a mortar). Then first linear cooling program was started: from temperature 68° C. to 65° C. in 15 h. Cooling was continued linearly from 65° C. to 35° C. in 30 h or in 12 h, respectively, in tests 1 and 2. The crystallization mass was mixed during cooling.

In the end temperature (35° C.), xylose crystals were separated from the crystallization mass by centrifugation. Centrifuge Hettich Roto Silenta II was used with a basket diameter of 23 cm. 1.0 to 1.5 kg of crystallization mass was poured onto the centrifuge basket at a slow rotation speed. The speed was increased to 3500 rpm, and centrifugation at this speed was continued for 5 min. During the speed increase to 3500 rpm the crystals were washed (sprayed) with 80 ml of water. After the centrifugation, the obtained crystal cake was weighed.

The following table presents the centrifugation results of the two crystallization tests.

| | Crystallization test 1 Cooling rate 1° C./h | Crystallization test 2 Cooling rate 2.5° C./h |
|---|---|---|
| Mass into centrifuge (g) | 1 514 | 1 081 |
| Mass RDS, % | 84.8 | 85.3 |
| Mass xylose, % on DS | 68.5 | 68.4 |
| Crystals washing (ml) | 80 | 80 |
| Crystal cake weight, g | 483 | 378 |
| Crystal cake DS content, % | 100 | 98.5 |
| Crystal cake xylose, % on DS | 99.3 | 98.2 |
| Run-off xylose, % on DS | 49.0 | 47.1 |
| Xylose yield/on xylose, % | 55 | 58 |

The following table presents further analysis results of the crystallization samples.

| | | RDS w-% | Glucose % on DS | Xylose % on DS | Arabinose % on DS | Oligo-saccharides % on DS |
|---|---|---|---|---|---|---|
| Cryst. 1 | Mass | 84.8 | 2.3 | 68.5 | 2.8 | 0.9 |
| Cryst. 1 | Centrif. cake | 100.0 | 0.6 | 99.3 | 0.0 | 0.0 |
| Cryst. 1 | Run-off | 72.8 | 3.7 | 49.0 | 4.5 | 1.5 |
| Cryst. 2 | Mass | 85.3 | 2.2 | 68.4 | 2.5 | 0.8 |
| Cryst. 2 | Centrif. cake | 98.5 | 0.5 | 98.2 | 0.0 | 0.0 |
| Cryst. 2 | Run-off | 72.4 | 3.7 | 47.1 | 4.2 | 1.3 |

The results indicate that very pure crystals with good yield are obtained in a short cooling crystallization time.

It will be obvious to a person skilled in the art that, as the technology advances, the inventive concept can be implemented in various ways. The invention and its embodiments are not limited to the examples described above but may vary within the scope of the claims.

The invention claimed is:

1. A process for the production of xylose and dissolving pulp from a hardwood biomass, which has a xylan content of 10 to 35%, calculated on the dry substance (DS) of the biomass,
    comprising the steps of:
        (a) prehydrolyzing the hardwood biomass in a digester with a solution containing sulphur dioxide in a concentration of 0.1 to 2.5% based on the total liquid weight of the prehydrolysis liquid, at a temperature of 120-150° C., a liquid-to-biomass ratio of less than 6, and with a reaction time of 0.3 to 1 h, to provide (1) a dissolved hemicellulose hydrolyzate, wherein the xylose content is 25 to 55% of the dissolved solids of the hydrolyzate, the ratio of xylose to xylo-oligomers is more than 2 and the xylose yield is 30 to 80% on xylan in the biomass, and (2) a non-dissolved prehydrolyzed biomass,
        (b) separating the dissolved hemicellulose hydrolyzate from the non-dissolved prehydrolyzed biomass,
        (c) subjecting the dissolved hemicellulose hydrolyzate to chromatographic fractionation, nanofiltration or precipitation crystallization to obtain a xylose product having a xylose content of at least 55% on DS, and
        (d) subjecting the non-dissolved prehydrolyzed biomass to sulphate cooking in a digester to obtain a dissolving pulp with a viscosity of more than 600 ml/g.

2. A process as claimed in claim 1, wherein the concentration of sulphur dioxide in the prehydrolysis is 0.1 to 2.0%.

3. A process as claimed in claim 1, wherein sulphur dioxide is added as a water solution or in a liquid or gas form.

4. A process as claimed in claim 1, wherein sulphur dioxide is impregnated into the hardwood biomass.

5. A process as claimed in claim 1, wherein the spent sulphur dioxide is recovered and returned to the prehydrolysis.

6. A process as claimed in claim 1, wherein sulphur dioxide is returned to the prehydrolysis by dissolving into water after having been liberated from the digester.

7. A process as claimed in claim 1, wherein the liquid/biomass ratio in the prehydrolysis is in the range of 1 to 6.

8. A process as claimed in claim 1, wherein 15 to 40% of the dry substance of the hardwood biomass is dissolved in the prehydrolysis.

9. A process as claimed in claim 1, wherein the prehydrolysis also comprises heating with direct steam.

10. A process as claimed in claim 1, wherein the content of xylose in the dissolved hemicellulose hydrolyzate is 35 to 55% on DS.

11. A process as claimed in claim 1, wherein the concentration of oligosaccharides in the dissolved hemicellulose hydrolyzate is less than 10% based on DS.

12. A process as claimed in claim 1, wherein the content of monosaccharides in the dissolved hemicellulose hydrolyzate is more than 35% based on DS.

13. A process as claimed in claim 1, wherein the content of xylose in the dissolved hemicellulose hydrolyzate is more than 65% based on total monosaccharides.

14. A process as claimed in claim 1, wherein the ratio of xylose to xylo-oligomers in the dissolved hemicellulose hydrolyzate is more than 10.

15. A process as claimed in claim 1, wherein the hemicellulose hydrolyzate has a dry substance content of more than 7% by weight.

16. A process as claimed in claim 1, wherein the process also comprises evaporation of the prehydrolyzate after step (a), wherein acetic acid is partially removed from the prehydrolyzate by evaporation.

17. A process as claimed in claim 1, wherein the process also comprises post-hydrolysis after step (a).

18. A process as claimed in claim 17, wherein the post-hydrolysis is selected from enzymatic post-hydrolysis and hydrolysis with a hydrolyzing agent selected from sulphuric acid and sulphur dioxide.

19. A process as claimed in claim 1, wherein the separation step (b) is carried out by washing selected from displacement wash, pressing and filtration.

20. A process as claimed in claim 19, wherein the displacement wash is carried out in the digester with a liquid selected from water, a condensate, white liquor, chromatographic separation residue fraction and a nanofiltration retentate.

21. A process as claimed in claim 19, wherein the yield of monomeric xylose dissolved from the biomass in the wash is 50 to 95%.

22. A process as claimed in claim 1, wherein the process also comprises pH adjustment before step (c).

23. A process as claimed in claim 1, wherein step (c) is carried out by chromatographic fractionation using an ion exchange resin as the column filling material.

24. A process as claimed in claim 23, wherein the ion exchange resin is a cation exchange resin.

25. A process as claimed in claim 24, wherein the cation exchange resin is a strongly acid cation exchange resin.

26. A process as claimed in claim 25, wherein the cation exchange resin is in a monovalent metal cation form.

27. A process as claimed in claim 1, wherein step (c) is carried out by nanofiltration, whereby the xylose product is recovered as the nanofiltration permeate.

28. A process as claimed in claim 1, wherein the xylose product recovered from step (e) is subjected to crystallization to obtain crystalline xylose.

29. A process as claimed in claim 1, wherein in step (d) dissolving pulp with a viscosity of more than 700 ml/g is obtained.

30. A process as claimed in claim 1, wherein in step (d) dissolving pulp is obtained with a yield of greater than 35% on dry biomass.

31. A process as claimed in claim 30, wherein in step (d) dissolving pulp is obtained with a yield of 76% or greater on dry biomass.

* * * * *